United States Patent
Azam et al.

(10) Patent No.: US 7,783,712 B2
(45) Date of Patent: Aug. 24, 2010

(54) SYSTEM AND METHOD FOR BI-DIRECTIONAL SYNCHRONIZED CONVERSION OF ELECTRONIC MAIL DATA

(75) Inventors: Syed Aamer Azam, Union City, CA (US); Jeffrey Kucer, Mountain View, CA (US); Richard Liebman, San Francisco, CA (US)

(73) Assignee: Data Transfer, LLC, Pittsford, NY (US)

( * ) Notice: Subject to any disclaimer, the term of this patent is extended or adjusted under 35 U.S.C. 154(b) by 360 days.

(21) Appl. No.: 11/852,131

(22) Filed: Sep. 7, 2007

(65) Prior Publication Data

US 2008/0235402 A1 Sep. 25, 2008

Related U.S. Application Data (60) Provisional application No. 60/895,954, filed on Mar. 20, 2007.

(51) Int. Cl.
*G06F 15/16* (2006.01)
*G06F 12/00* (2006.01)

(52) U.S. Cl. ...................................... 709/206; 709/207

(58) Field of Classification Search ................ 709/206, 709/207, 225–229, 217–218, 250
See application file for complete search history.

(56) References Cited

U.S. PATENT DOCUMENTS

| | | | | |
|---|---|---|---|---|
| 5,647,002 A | * | 7/1997 | Brunson | ..................... 709/206 |
| 5,737,560 A | | 4/1998 | Yohanan | |
| 5,948,059 A | * | 9/1999 | Woo et al. | .................... 709/206 |
| 5,951,638 A | * | 9/1999 | Hoss et al. | ................... 709/206 |
| 5,982,520 A | | 11/1999 | Weiser et al. | |
| 6,178,443 B1 | | 1/2001 | Lin | |
| 6,256,378 B1 | | 7/2001 | Iggulden et al. | |
| 6,269,369 B1 | | 7/2001 | Robertson | |

(Continued)

FOREIGN PATENT DOCUMENTS

EP 0944002 A1 9/1999

(Continued)

OTHER PUBLICATIONS

International Preliminary Report on Patentability and Written Opinion for PCT/US/2004/014312 dated Oct. 8, 2004, 5 pages.

*Primary Examiner*—Zarni Maung
(74) *Attorney, Agent, or Firm*—Dardi & Herbert, PLLC; Peter S. Dardi (57) ABSTRACT

A portable storage device is connected to a first computer and the email data is synchronized between the first computer and the device. The portable storage device can then be connected to a second computer that has an email program that is incompatible with the first computer's email program. The second computer is personalized with the email data retrieved from the portable device. The user is allowed to use the second computer to send or receive emails and otherwise alter the email data. Upon logging out of the second computer, any changes made thereon can be recorded to the portable storage device. The device can then be re-connected to the first computer and the data can once again be re-synchronized. The universal format database enables bidirectional synchronization and conversion of email data between multiple incompatible format email programs.

10 Claims, 6 Drawing Sheets

U.S. PATENT DOCUMENTS

| | | |
|---|---|---|
| 6,393,462 B1 | 5/2002 | Mullen-Schultz |
| 6,651,095 B2 | 11/2003 | Barlock et al. |
| 7,024,457 B1 * | 4/2006 | Newman et al. ............ 709/206 |
| 7,299,422 B2 | 11/2007 | Levine et al. |
| 2002/0010755 A1 | 1/2002 | Rankin |
| 2002/0078367 A1 | 6/2002 | Lang et al. |
| 2002/0111972 A1 | 8/2002 | Lynch et al. |
| 2002/0116467 A1 * | 8/2002 | Boyer et al. ................ 709/206 |
| 2002/0122076 A1 | 9/2002 | Nakaki |
| 2002/0143637 A1 | 10/2002 | Shmueli et al. |
| 2002/0145632 A1 | 10/2002 | Shmueli et al. |
| 2002/0147653 A1 | 10/2002 | Shmueli et al. |
| 2002/0147912 A1 | 10/2002 | Shmueli et al. |
| 2002/0162009 A1 | 10/2002 | Shmueli et al. |
| 2003/0110371 A1 | 6/2003 | Yang et al. |
| 2003/0120750 A1 | 6/2003 | Gaxiola |
| 2003/0169283 A1 | 9/2003 | Rosenburg |
| 2004/0001088 A1 | 1/2004 | Stancil et al. |
| 2004/0073787 A1 | 4/2004 | Ban et al. |
| 2004/0107208 A1 | 6/2004 | Seet et al. |
| 2004/0128389 A1 | 7/2004 | Kopchik |
| 2006/0095476 A1 * | 5/2006 | Dauer et al. ................ 707/200 |
| 2006/0248155 A1 * | 11/2006 | Bondarenko et al. ........ 709/206 |
| 2007/0094414 A1 * | 4/2007 | Das ............................ 709/248 |
| 2008/0168126 A1 * | 7/2008 | Freedman ................... 709/202 |

FOREIGN PATENT DOCUMENTS

| | | |
|---|---|---|
| GB | 2366038 A | 2/2002 |
| GB | 2371123 A | 7/2002 |
| GB | 2387682 | 10/2003 |
| WO | 99/33293 A1 | 7/1999 |

* cited by examiner

SYSTEM AND METHOD FOR BI-DIRECTIONAL SYNCHRONIZED CONVERSION OF ELECTRONIC MAIL DATA

CLAIM OF PRIORITY

This application claims priority to U.S. Provisional Patent Application No. 60/895,954 entitled "SYSTEM AND METHOD FOR BI-DIRECTIONAL SYNCHRONIZED CONVERSION OF ELECTRONIC MAIL DATA" by Syed Aamer Azam et al., filed Mar. 20, 2007, the entire contents of which is incorporated herein by reference.

CROSS REFERENCE TO RELATED APPLICATIONS

The following commonly owned, co-pending U.S. patent application is related to the present Application and is incorporated by reference herein in its entirety:

U.S. patent application Ser. No. 10/435,070, entitled "SYSTEM AND METHOD FOR TRANSFERRING PERSONALIZATION INFORMATION AMONG COMPUTER SYSTEMS", by David Brett Levine, et al., filed on May 8, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to electronic mail (email) clients and servers and more particularly to synchronizing and converting data among multiple different email programs.

BACKGROUND

Electronic mail (email) as well as other types of collaborative software systems are well known and have become a standard in the field of communications and the sharing and transferring of data amongst users. The vast majority of companies and individuals today implement some form of such collaborative systems in order to facilitate interactions across the internet or various intranets. For example, the standard email system may allow an electronic message to be generated and transferred via a computer network such as the Internet. Furthermore, such software typically includes additional features of calendar, task and contact management, note taking and other helpful tools for collaboration and work in an organization.

With conventional electronic (email) mail programs, an individual's email data is normally stored on a computer that has the software installed thereon. For example, a user's home personal computer (PC) will typically maintain all of the email data for that particular user. This can present problems when a person wishes to access and use email services from computers other than the home PC, which do not have the same data. Additionally, even if they are able to do so, further inconveniences can arise when the user returns to his or her home PC and the data stored thereon is stale and not up to date with what was modified while being away.

A variety of different approaches have been developed to address such problems. A common scenario often involves carrying laptops or personal digital assistants (PDAs) in order to access email services and data on the go. However, these types of solutions present a multitude of other requirements and possible inconveniences such as cost, size and interface considerations, remote access to the internet, which is not always available, and various other issues.

One possible technique is described in a related U.S. patent application Ser. No. 10/435,070 which is incorporated herein by reference in its entirety. This method utilizes a portable storage device, such as a USB flash drive, that can be connected to a home PC in order to download and store personal data for the user, such that he or she may take it to a guest computer and use it thereon. However, proprietary email technologies often vary from one personal computer to the next and this can preclude an individual from accessing or manipulating his personal data if the guest computer is not equipped with the same type of electronic mail client system as the home PC. As an illustration, if a user is using Microsoft Outlook at home and the guest computer is instead equipped with Lotus Notes or Windows Mail, the user would be unable to access or manipulate his email data from the portable device by using the guest computer. In light of these and other shortcomings in the art, what is desirable, is a system and method for synchronizing electronic mail data across multiple computers with different email clients, regardless of the proprietary technology that they implement.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in an accessible device or appliance with storage capacity. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for bidirectional conversion and synchronization of electronic mail data. This feature enables users to synchronize data across a plurality of different email programs. In one embodiment, the user synchronizes the email data from a first computer with a portable storage device. The user then moves to a second computer and personalizes that second computer with data from the first computer by using the portable device. The second computer (also referred to as the guest computer or login computer) may not have the original email software program (e.g. Microsoft Outlook) which was installed on the first computer (also referred to as the home computer or the synchronized computer). In this case, the synchronization software from the portable storage device can transform the original email data into a format readable by a ubiquitous program, such as Outlook Express or Windows Mail. The user can then employ the software of the second computer to send, receive and modify emails. After logging out of the guest computer and returning to the home computer, the user is able to resynchronize the email data with the original email client, such as Outlook, thereby bringing his data up to date. Because the vast majority of today's personal computers are equipped with some form of email software, the user is able to effectively function as if the original program is carried on the portable storage device.

As a general overview illustration, a portable storage device can first be connected to a home computer and the email data between this PC and the portable storage device can be synchronized. This synchronization can include copying or modifying email data to the portable device in order to reflect the data of the user's home PC. The user can then disconnect the portable storage device from the first computer. Subsequently, the user can connect the portable storage device to a second computer, such as a guest, temporary or public-use computer. At this point, the second computer is personalized with the email data from the portable storage device, such as by creating a set of temporary mail folders inside the email client on the second computer, which contain all of the emails and other information retrieved from the first computer.

The user can thus take advantage of the email or other collaboration software on the second computer as if it were his original home PC. For example, the user can send or receive emails, edit and modify calendar events, create new contacts and perform various other functions. Once finished, the portable storage device can be logged out of the second computer, at which time, the changes made by the user on the second computer can be recorded to the portable storage device. Upon logging out, the second computer can also be depersonalized so as to remove the user's email data therefrom.

Upon returning the portable device to the first computer, the user can re-connect the device and all of the modifications to the data made at the second computer can be re-synchronized with the native email data stored on the first computer. Via the use of the portable storage device in this manner, the user can have access to the latest version of his personal data at any computer, regardless of the type of proprietary email system software that is loaded thereon.

One significant advantage of the various embodiments, is the ability of the user to access and synchronize the email data from the portable storage device even when the second computer is not equipped with a compatible email program. This is enabled by the universal format database which can store features and data which is common among a multitude of email programs. This universal format database will be described in further detail below. Another advantage is the ability to bi-directionally convert email data between multiple email clients, while efficiently incorporating all changes made to the data on the previous client. Various other advantages will also be apparent to one of ordinary skill in the art, upon reviewing the specification, figures and the claims.

Figure 1:
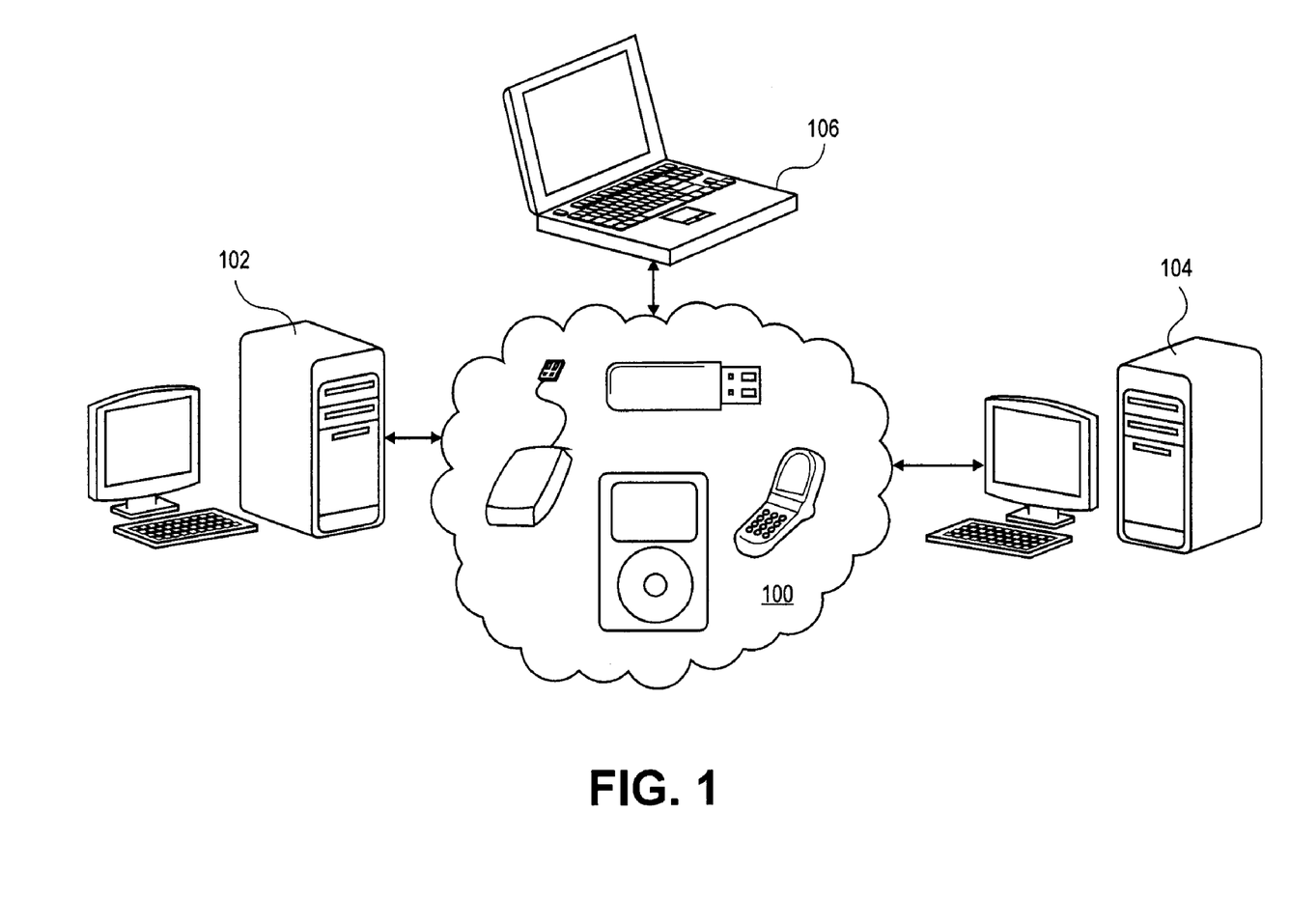
FIG. 1 is an exemplary illustration of various devices and components that can be used in accordance with various embodiments of the present invention.

FIG. 1 is an exemplary illustration of various devices and components that can be used in accordance with various embodiments of the present invention. Although this diagram depicts components as logically separate, such depiction is merely for illustrative purposes. It will be apparent to those skilled in the art that the components portrayed in this figure can be arbitrarily combined or divided into separate hardware, or can be distributed among different computing devices, or connected by one or more networks or other suitable communication means.

As illustrated, the portable storage device 100 can take the form of a universal serial bus (USB) flash drive or hard drive, a cellular telephone, a portable music or MP3 player, or any other device that is capable of storing electronic data, such as computer readable instructions. The portable device 100 can be loaded with software configured to perform the functionality discussed throughout the various embodiments of the present invention. The software can be made available for download via a computer network, such as the internet, manually installed, or come preloaded on the portable storage device.

The portable storage device 100 can be connected to a personal computer such as a home PC 102, a laptop 106 or a work/office PC 104, via a universal serial bus (USB) interface or a wireless connection. Upon establishing the connection, the software program residing on the portable storage device can be loaded and executed by the computer and can cause various steps to be performed, such as synchronizing the email data between the computer and the device, or personalizing the computer with the email data stored on the device, as will be described in further detail below. It should be noted that the invention is not limited to any particular type of computing device, software nor connection, and any such means can be used, as presently known in the art.

Figure 2:
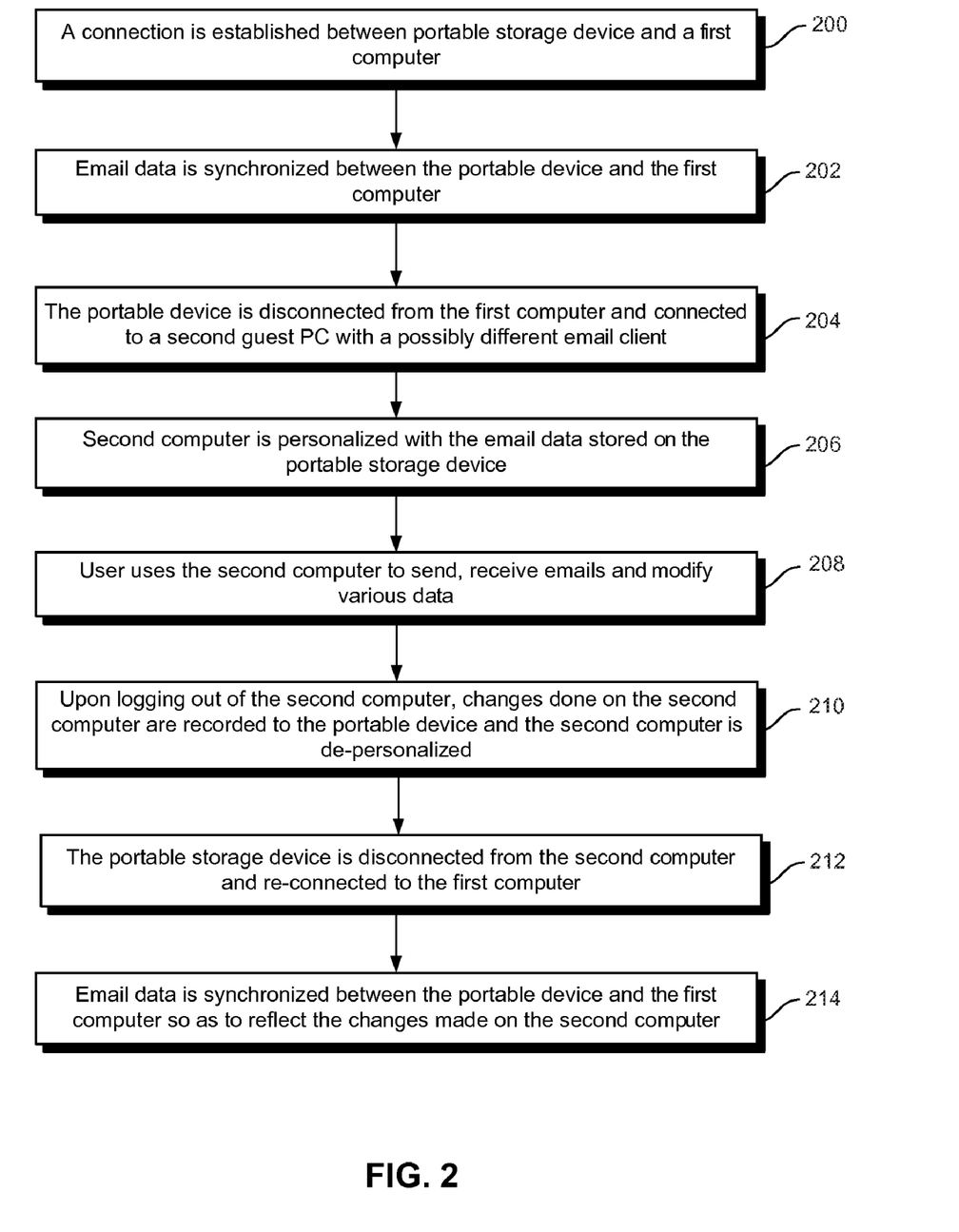
FIG. 2 is an exemplary general overview flow diagram of a process that can be used in accordance with various embodiments.

FIG. 2 is an exemplary general overview flow diagram of a process that can be used in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 200, a connection is first established between the portable storage device and the first computer. The connection can be established, for example, by physically connecting the portable device via a USB interface to a personal computer. In step 202, email data is synchronized between the first computer and the portable storage device. In one embodiment, this process writes the user's email data to the portable storage device in its native format and this is accomplished by the native synchronization process, as will be described in further detail below. Step 202 can also include creating a universal format database from the native email data retrieved from the first computer.

In step 204, the portable storage device can then be disconnected from the first computer and connected to a second login computer. In various embodiments, the second computer may or may not be equipped with the same email program as the first computer. As shown in step 206, the second computer is then personalized with the email data stored on the device. For example, if the second computer is equipped with a compatible email program, the native database of the portable device can be used to personalize the second computer. On the other hand, if the second computer is not installed with the same email software, this step may include creating a temporary native database on the second computer by converting the data from the universal database into the format of the email program that is installed on the second computer. Since the vast majority of computers do carry some form of email program, this effectively enables the user to access his emails at almost any such computing device.

In step 208, the user can log into the second computer and access his email data. This can include sending and receiving emails, scheduling calendar events, creating new contacts and performing various other tasks associated with collaborative software. Once finished, the user select to log out of the second computer. Upon logging out, any changes done thereon can be recorded to the portable storage device, the as shown in step 210. In the embodiment where a different email client is used, this step also encompasses grabbing any changes done to the temporary folder created on the second computer and writing those changes to the universal database of the portable storage device. The second computer can also be de-personalized so as to remove all traces of the user's email data from the second computer.

In step 212, the portable storage device can be safely disconnected from the second computer. Upon returning to the original synchronized computer, the portable device can be reconnected and the email data can be re-synchronized thereon, as shown in step 214. In one embodiment this can include incorporating into the data on the first computer any changes made in step 208.

Figure 3:
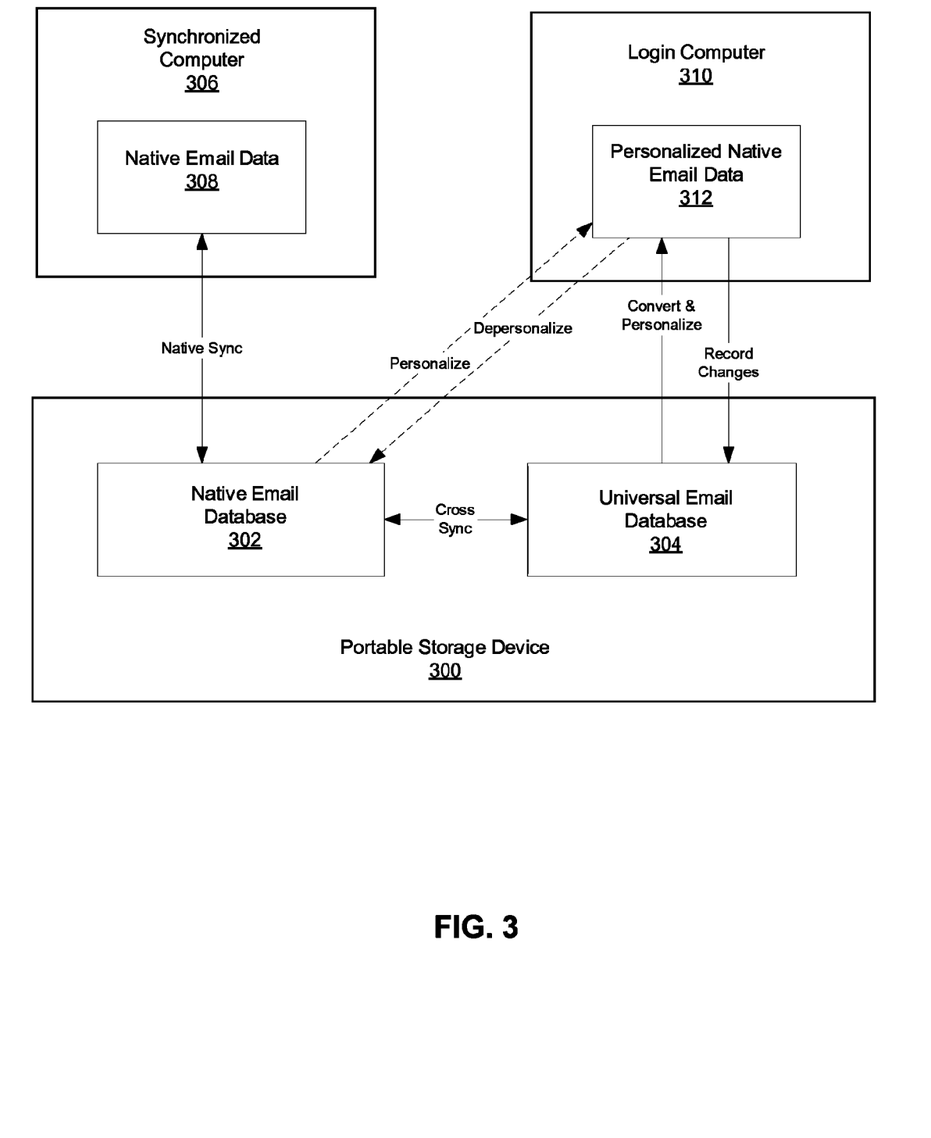
FIG. 3 is an exemplary illustration of the data flow between components of the system in accordance with various embodiments.

FIG. 3 is an exemplary illustration of the data flow between components of the system in accordance with various embodiments. Although this diagram depicts components as logically separate, such depiction is for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the portable storage device 300 can store email data in both the native format 302 and in a universal format database 304. This is done for purposes of efficiency and minimizing the read/write time associated with synchronizing. For example, converting email data from its native format to the universal format or vice versa may incur undesirable latency during which the user must wait for the data to be converted. However, this latency of conversion is unnecessary if the second login computer 310 is equipped with the same native email program as the first computer 306. In this scenario, the device is able to synchronize and personalize data significantly faster by storing the email data in both formats.

Continuing with the illustration, the native database 302 can be used to perform native synchronization with the native email data 308 on the first computer 306. This process can be called to execute upon the user selecting the "Synchronize" option and it can include invoking appropriate application programming interface (API) calls of the native email client in order to read, write and update the email data between the portable device and the first computer 306.

Furthermore, the native database 302 can also be used to personalize the email data 312 on the second computer in cases where the login computer 302 is installed with the native email program. In the event that the login computer does not have the native email program, the universal email database 304 is used instead, in order to convert email data into the format of another email program and to personalize the login computer with the converted data. In one embodiment, this process includes creating a temporary folder on the login computer and writing appropriate files from the universal database into the temporary folder. Upon logout, the temporary folder can be removed subsequent to recording any changes made to the temporary folder by the user.

In various embodiments, the native email database 302 and the universal email database 304 may need to be cross-synchronized at various times in order to ensure that the data in each database is up-to-date. For example, when the user has modified data using the login computer not equipped with the native email program, the data in the native email database 302 may be stale. Similarly, if the user has modified data using the native email program, the universal database can be out of date. Cross-synchronization can perform appropriate create, read, update and delete (CRUD) operations on the device to ensure that each database has the latest version of the user's email information. A flag can be set by the various processes in order to determine when the data is out-of-sync. In one embodiment, a flag can be set after each time that cross-synchronization is performed to indicate that each database is in sync. Subsequently, upon changing any database, the flags can be modified so as to reflect possibly stale data in one or more databases.

It should be noted that cross-synchronization can be performed at a plurality of different times in the overall process, and that the present invention is not limited to any particular implementation. For example, cross-synchronization can be executed just prior to logging out of a computer (either first or second), or upon establishing a connection with either computer, or at both times or at various other junctures. Furthermore, it should also be noted that, while only two databases are illustrated in FIG. 3, the portable device can include additional databases (not shown), such as one for each native email program encountered. In some embodiments, cross-synchronizing may involve updating each of those additional databases.

Figure 4:
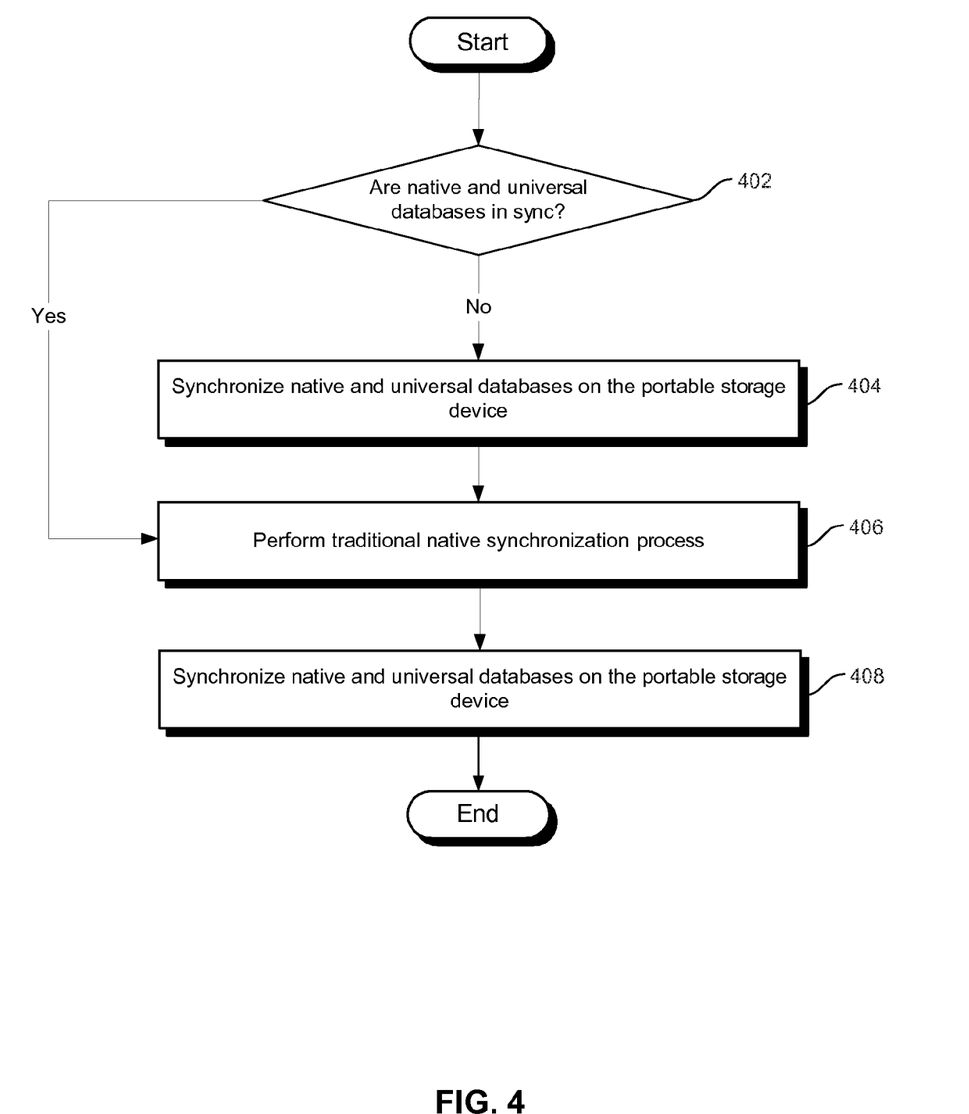
FIG. 4 is an exemplary flow diagram of a synchronization process that can be used in accordance with various embodiments.

FIG. 4 is an exemplary flow diagram of a synchronization process that can be used in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

Upon establishing a connection to the first computer and loading the synchronization software from the portable device, a determination can be made whether the native and universal databases are in sync, as shown in step 402. In step 404, if any of the databases are stale, cross-synchronization can be performed for all databases determined to by out-of-sync, as previously discussed. If all databases are in sync (or if this is the first time the device is connected to a home computer), traditional native synchronization can be performed, as shown in step 406. In one embodiment, the first time the device is loaded, all or a portion of the user's email data is written from the first computer to the native database on the portable storage device. For example, all of the user's contacts, mail accounts settings and a portion or all of the mail messages can be stored to the device. On subsequent invocations of this process, only new data may need to be written from the device to the synchronized computer (or vice versa) in order to keep the two synchronized.

After the native synchronization process completes, the native and universal databases can optionally be once again cross-synchronized, as shown in step 408. During the first synchronization with the native email client, the user can be provided with the option to "Take email in a form that can be read by other email programs." If selected, step 408 can also include generating a universal database on the portable device, based on the native data retrieved from the first computer. This process can create universal databases for all synchronized email programs. In one embodiment, generating the universal database includes determining the common features among a plurality of proprietary email programs and creating a database schema for storing these features in an independent universal format. The database schema will be described in further detail below. Furthermore, this process can also include determining features from the native email program which are not supported by other email programs (e.g. have no corresponding fields, files or structures) and storing these features into the universal database as well. These non-conforming features and fields can be marked as read-only. Subsequently, during personalization of the target computer, the unsupported features and data can be converted into selected portions of features and data that are compatible with the target email program. As an illustration, if a target computer email program did not have a calendar feature, the calendar items taken from the first computer may be converted into a set of inbox items in a separate folder on the login computer, such that the user is able to display and view the calendar items on the target computer. While in some cases, there may not be an application necessary to create or modify these items, the user is nonetheless provided with access to existing items across different platforms. In other cases, an appropriate application can be downloaded or carried with the portable storage device so as to allow the user to access all functionality of the unsupported features. After generation of universal database is complete, a flag can be set for every email program, indicating that the universal and native databases are in sync for the respective program.

Figure 5:
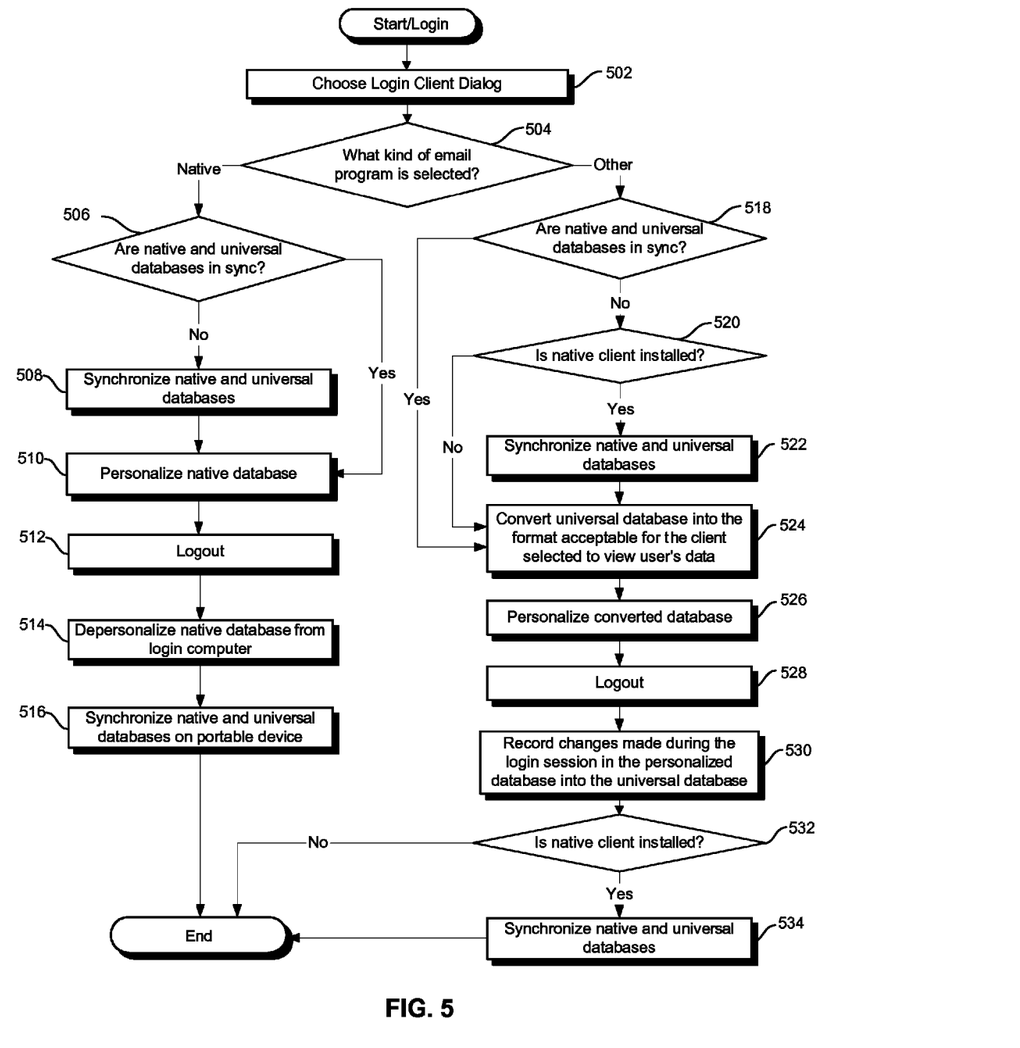
FIG. 5 is an exemplary flow diagram of a login session process at a guest computer, in accordance with various embodiments.

FIG. 5 is an exemplary flow diagram of a login session process at a guest computer, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

Upon logging in and establishing the connection between the portable device and the second computer, a login client dialog can be selected, as shown in step 502. In step 504, a determination is made as to what type of email program has been selected by the user to view his or her email data. In one embodiment, a user can be given a choice to use a different email program even though the native program may be installed on the guest computer. Alternatively, a user may also be forced to use the native program if one is available.

If the user has elected to view the data using the same email program as the synchronized email program (e.g. Outlook view using data synched from Outlook), a corresponding native customizer can be started. In various embodiments, a separate customizer module is provided for each email software program, such as COutlookCustomizer, COutlookExpressCustomizer, CLotusNotesCustomizer, etc. Each native customizer module can be responsible for performing the various functions for its corresponding email program, as described throughout this specification.

In step 506, the native customizer checks if the universal and native databases of the processing email program are in sync. If these databases are out-of-sync (this could happen, for example, if the user had personalized into another computer and viewed his data using the other email program while the native email program was not installed on that computer), the customizer initiates the cross-synchronization process for the native and universal databases on the device, as shown in step 508.

In step 510, the native customizer personalizes the native database to the login computer. This can be a traditional native process invoked by making selective calls via the API of the native email program. Subsequently, the user can use the login computer to send and receive emails and perform various other functions.

In step 512, the user can select to logout of the second computer. Upon logout, the customizer can initiate the depersonalization process, as well as synchronize the native and universal databases on the portable device, as shown in steps 514 and 516. This cross-synchronization can be done to keep the two databases in sync to always provide the user with the latest version of the email data.

If it is determined in step 504 that the user has elected to view email using a different email program from the one used to synchronize his or her email data, the corresponding universal customizer can be initiated. For example, the user may elect to use Outlook to view data synched from Outlook Express. The universal customizer then checks if the universal and native databases of the processing email program are in sync, as illustrated in step 518. If these databases are out-of-sync and the native email program is installed on the guest computer (as determined in step 520), the customizer can cross-synchronize the native and universal databases in step 522. If the native email program is installed on the guest computer, its APIs may be used in the synchronization. In some embodiments, steps 518, 520 and 522 could be omitted if the program were set up to prohibit the user from using a different email program if the native email program were installed on the computer.

If the native and universal databases are already in sync, or if no native client is installed on the guest computer, in step 524 the universal customizer creates a personalized database for the email program selected to view the data by converting the data in the universal database into a format acceptable for the email program on the guest computer. This converted database can be used to personalize the second computer, as shown in step 526. In one embodiment, a temporary folder is created on the guest machine, containing the data retrieved from the universal database. The temporary folder contains data in the format of the email program from the second computer such that user can obtain access to this data.

When the user logs out in step 528, the customizer can update the universal database with the data from the personalized database, as shown in step 530. This can be accomplished by recording the data including all of the changes made, to the universal database, and removing the temporary folder from the guest machine. If the native email program is installed on the second computer (step 532), the native and universal databases on the portable device can once again be synchronized so as to update the email data in any native databases, as shown in step 534.

Once the user returns to the synchronized computer, the data stored thereon can be resynchronized with the portable device by using the process previously illustrated and described in connection with FIG. 4.

Processes

Native Synchronization of Email Databases—This process synchronizes the email data between the portable storage device and the first computer (synchronized computer). It can be executed upon connecting the storage device for the first time to the synchronized computer or upon any subsequent re-connection so as to re-synchronize the email data. Native synchronization can include reading and writing data to and from the portable storage device, while preventing the duplication of any data that may exist in both places (i.e. on the device and on the first computer). In one embodiment, an algorithm is implemented that uses the subject and the date fields of an email message in order to generate a hash value. This hash value can then be used to uniquely identify the message or other entity and to prevent any duplication of data. It should be noted that various other algorithms can also be implemented within the scope of the present disclosure in order to uniquely identify the data to be synchronized.

Cross-Synchronization of Native and Universal Databases on the Device—This process synchronizes the email data between the native and the universal database on the device. During the first connection of the device to the home computer, this process can create a universal database for the native data stored on the portable device. This process can include identifying all features commonly supported by the various email programs and creating tables and fields in the universal database to store those features. Furthermore, generating the universal database also includes identifying the features of the native program which are not supported by other email programs. The data for these unsupported features can be stored in the universal database and marked as being read-only and unsupported by other email programs. For example, a specific type of calendar event can be stored as a general item in the universal database and can be marked by setting read-only flag on that particular item. In this manner, all data can be represented some way in the universal database and different email clients can at least allow the user to view the data.

During various other connections, cross-synchronization can also synchronize the data modified in either database so as to keep the email data up-to-date in all databases. For example, cross-synchronization can update the native database so as to reflect any changes performed at the second computer if those changes were stored to the universal database. Alternatively, it can update the universal database if changes were made by the user to the native database at the first computer. Cross-synchronization can be executed at several points, such as upon re-connecting the portable device to either computer, or just prior to terminating the connection, as previously discussed. One or more flags (e.g. binary values or codes) can be set by the program so as to determine whether either database is out of sync with the other.

Personalization of Native Email Databases—This process can personalize the second login computer with the native email database stored on the portable storage device. In one embodiment, this process is called only if the same email client is loaded on both the second computer and the first synchronized computer. This process personalizes the second computer directly with the native data so as to eliminate the latency costs of converting data between the universal and the native databases. In one embodiment, because the files are already stored on the portable device in their native format, no data copying or converting is required because appropriate API calls can simply point the email program of the second computer to the files stored on the portable device. In this manner, native client access to the email data can be almost instantaneous from the point of view of the user.

De-personalization of Native Mail Databases—This process can depersonalize the second computer to reverse the previous process discussed above. For example, via appropriate API calls to the email program, the display of email messages, calendar appointments, etc. pointing to the portable device can be removed from the login computer. In other embodiments, de-personalization can also remove any temporary data from the second computer just prior to or upon terminating the connection between the device and the second computer. For example, any temporary folders and files can be deleted from the second computer.

Converting Universal Email Databases to Native Format and Personalizing them on the Login Computer—This process can create a temporary folder on the second computer in the native format of that computer's email program. This temporary folder can be created by converting the email data from the universal database on the portable device into the native format of the second email client via that client's API calls. In some embodiments, any files or entities previously identified as not having a corresponding counterpart in the format of second email program can be transformed into read-only files or other entities of the second email program so that the data can be viewed at the second computer. As one non-limiting illustration, if a second computer did not have a calendar event, the data from the universal database representing a calendar event can be presented as an inbox item on the second computer. In this manner, while a user may not have the application to manipulate the non-conforming data, he or she may at least view and have access to such data by the second email client. The set of temporary files and folders can subsequently be removed once the user has chosen to log out of the second computer.

Grabbing Changes Made During the Login Session in the Personalized Databases into the Universal Database—This process incorporates any changes made by the user at the second computer into the universal database on the portable storage device. In one embodiment, prior to erasing the temporary native folder created at the second computer, the changes from that folder are merged into the universal database on the device. At this point, the universal database can optionally be synchronized with all native databases on the portable device. Alternatively, this synchronization can be performed at another time, such as upon a subsequent connection to the first computer.

It should be noted that the above processes are described for illustration purposes only and that they can be combined or separated into other processes that accomplish similar objectives within the scope of the present invention.

Application Programming Interfaces (APIs)

In some embodiments, the various processes of the computer program stored on the portable storage device can utilize the following application programming interfaces (APIs) in order to read, write, manipulate and convert email data:

1. IMessage:IMAPIProp interface—can be used to access and construct Outlook email messages.

2. IMimeMessage interface—can be used to access and construct Outlook Express email messages.

3. IMAPIProp interface—can be used to access and construct MS Windows Address Book contacts and Outlook contacts.

4. Lotus Notes C and C++ API—can be used to access and construct Lotus Notes data such as email messages and contacts.

5. SQLite Database Format—can be used to store mail items in the universal format on the portable storage device.

Of course, this list is not intended to be exhaustive and other such proprietary APIs may also be utilized well within the scope of the present invention.

Universal Database Schema

Figure 6:
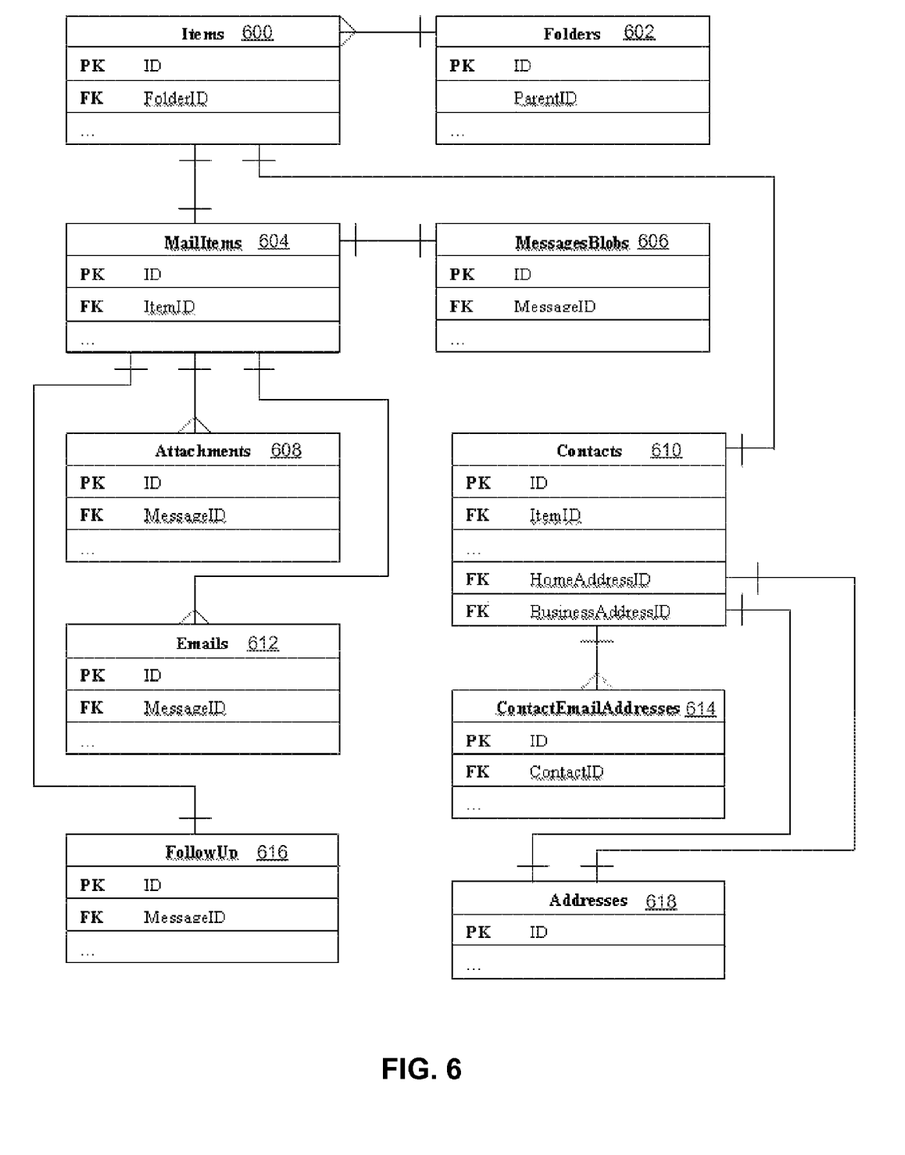
FIG. 6 is an exemplary diagram illustration of a sample universal database schema, in accordance with various embodiments.

FIG. 6 is an exemplary diagram illustration of a sample universal database schema, in accordance with various embodiments. Although this diagram depicts components as logically separate and specifically related to one another, such depiction is for illustrative purposes. It will be apparent to those skilled in the art that the components and relationships portrayed in this figure can be rearranged, combined or divided into separate database tables and fields that fall within the scope of the embodiments of the present invention. Furthermore, it will also be apparent to those skilled in the art that such components, regardless of how they are combined or divided, can be stored in a variety of database formats and on a multitude of different hardware devices.

The data in the universal database can be arranged in various tables that are related to one another by one-to-one or one-to-many types of relationships. For example, as illustrated, each item in the Items able 600 can represent a mail item 604 or a contact 610. The relationship between the item and the mail item is a one-to-one type of relationship. On the other hand, the folders table 602 can contain a plurality (one or more) of items 600 and thus the relationship illustrated is a one-to-many type of relationship. The database schema shown also includes the tables of message blobs 606, email attachments 608, emails 612, contact email addresses 614, follow up 616, and address 618. Each of these tables can have a plurality of fields, such as the primary key (PK) field, foreign key (FK) field, as well as various other fields for containing information about the items stored therein. An exemplary portion of such fields is shown in Tables 1 and 3 below for illustration purposes.

TABLE 1

(Items Table)

| Field | Description |
| --- | --- |
| ID, INTEGER | Items table primary key |
| FolderID, INTEGER | Folders table primary key |
| Flags, INTEGER | Items flags (its structure is the same as the MAPI PR_MESSAGE_FLAGS property's structure). |
| ItemSize, INTEGER | Item size in bytes |
| LastModificationTime, BLOB (Binary Large Object) | Last modification time of the item as FILETIME. |
| Subject, TEXT | Item subject |
| ItemClass, INTEGER | Item class, it has one of the following values: 0 - ITEM_CLASS_GENERAL - all items except contacts and appointments 1 - ITEM_CLASS_CONTACT - a contact 2 - ITEM_CLASS_APPOINTMENT - an appointment |
| ReadOnly, INTEGER | This flag is set to false for mail message items (if its MAPI class is IPM.Note or IPM.Post) or contacts (its MAPI class is IPM.Contact). For other items this flag is true. If ReadOnly is true, the item's changes will not be synchronized from the guest computer to the main computer. This allows personalizing Outlook items, which are not supported by Outlook Express, to Outlook Express as mail messages. For example, calendars can be personalized as read only mail messages. |

Table 2 (below) shows exemplary corresponding relationships between the Items table 600 fields of the universal database and the native email program API properties. For example, relationships are shown to properties of two email clients, Microsoft Outlook MAPI and Outlook Express.

TABLE 2

| Items Table Field | Outlook (MAPI) Property | Outlook Express Property |
| --- | --- | --- |
| Flags | PR_MESSAGE_FLAGS | MESSAGEPROPRS::dwState is used to get value |
| ItemSize | PR_MESSAGE_SIZE | MESSAGEPROPRS::cbMessage |
| LastModificationTime | PR_LAST_MODIFICATION_TIME | MESAGEPROPRS::ftSent is used to get value; PID_HDR_DATE is used to save value. |
| Subject | PR_SUBJECT_W/ PR_SUBJECT_A | PID_HDR_SUBJECT |
| ItemClass | PR_MESSAGE_CLASS | PID_HDR_CNTTYPE is analyzed to get value |
| ReadOnly | PR_MESSAGE_CLASS is analyzed to get value (if MAPI class is IPM.Note, IPM.Post or IPM.Contact, ReadOnly is false, else - true. | False Always |

Table 3 (below) illustrates exemplary fields of the Mail Items table 604 of the universal database schema,

TABLE 3

(Mail Items Table)

| Field | Description |
| --- | --- |
| ID, INTEGER | MailItems table primary key |
| ItemID, INTEGER | Foreign Key to Items table |
| SentDate, BLOB | Mail message's sent date |
| ReceivedDate, BLOB | Mail message's received date |

TABLE 3-continued (Mail Items Table)

| | |
|---|---|
| InternetMessageId, TEXT | Internet message ID |
| HasAttachments, INTEGER | It is set to true if mail message has attachments, else it is set to false |
| CodePage, INTEGER | Mail message codepage |
| Priority, INTEGER | Mail message priority, it has one of the following values:<br>0 - low<br>1 - Normal<br>2 - High |
| Security, INTEGER | Security flag, it has one of the following values:<br>1 - SECURITY_SIGNED<br>2 - SECURITY_ENCRYPTED<br>0 - regular message |
| ContentType, TEXT | Multipurpose Internet Mail Extensions (MIME) message content type |
| MessageClass, TEXT | Message class |
| Reply, INTEGER | Replayed messages icon ID, it has different values for signed, encrypted and regular messages |

Table 4 (below) illustrates exemplary corresponding relationships between the Mail Items table 604 fields of the universal database and the native email program API properties. As an example, relationships are shown to properties of two email clients, Microsoft Outlook MAPI and Outlook Express.

TABLE 4

| Mail Items Field | Outlook (MAPI) Property | Outlook Express Property |
|---|---|---|
| SentDate | PR_CLIENT_SUBMIT_TIME | MESSAGEPROPS::ftSent is used to get value |
| ReceivedDate | PR_MESSAGE_DELIVERY_TIME - "X-OriginalArrivalTime" named property | "Received-Date" message property/ MESSAGEPROPS::ftReceived is used to get value, "X-OriginalArrivalTime" body property, "Received", "Received-Date" message properties and PID_HDR_RECEIVED are used to set value |
| InternetMessageId | PR_INTERNET_MESSAGE_ID | PID_HDR_MESSAGEID |
| HasAttachments | PR_HASATTACH | PID_HDR_CNTTYPE/ IMimeMessage::GetAttachments( ) is used to get value; MSGFLAG_HASATTACH flag and IStoreFolder::CommitStream( ) is used to set value |
| CodePage | PR_INTERNET_CPID/ PR_MESSAGE_CODEPAGE | PID_PAR_CHARSET is used to get value; IMimeMessageTree::SetCharset( ) is used to set property |
| Priority | PR_IMPORTANCE | MESSAGEPROPS::priority is used to get value; "X-Priority" body property is used to set value |
| Security | PR_SECURITY | MESSAGEPROPRS::dwFlags |
| ContentType | "content-type" named property | PID_HDR_CNTTYPE |
| MessageClass | PR_MESSAGE_CLASS/ "content-type" named property | PID_HDR_CNTTYPE is used to get value |
| Reply | PR_REPLY | MSG_REPLIED and MESSAGEPROPS::dwState is analyzed to get value; MSG_REPLIED is used to set value. |

Various embodiments of the invention include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art, Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for bidirectional synchronized conversion of electronic mail (email) data between multiple computers, said method comprising: establishing a connection between a portable storage device and a first computer, said first computer having a first email program installed thereon; synchronizing native email data of the first computer with email data on said portable storage device wherein said synchronizing includes generating a universal database on said portable storage device, said universal database based on said native email data; establishing a connection between said portable storage device and a second computer, said second computer having a second email program installed thereon, said second email program having an incompatible format with respect to said first email program; generating a second native database by converting said universal database into the format of said second email program such that said second computer is able to access said second native database by using the second email program; and personalizing said second computer with the second native database.

2. The method of claim 1, further comprising: receiving, at said second computer, one or more modifications to said second native database; and synchronizing said one or more modifications to said second native database with the universal database such that said universal database has a latest version of said email data; depersonalizing said second computer by removing said second native database from said second computer and terminating the connection between said portable storage device and said second computer.

3. The method of claim 2, further comprising: re-establishing the connection between the portable storage device and said first computer; and synchronizing said native email data of the first computer with the email data on said portable storage device such that said native email data of the first computer is up-to-date with said email data on said portable storage device.

4. The method of claim 1 wherein generating a universal database on said portable storage device further includes: identifying one or more common features supported by the formats of both said first email program and said second email program; and generating a set of tables and fields to store said common features.

5. The method of claim 1 wherein generating a universal database on said portable storage device further includes: identifying a portion of said native email data which does not have corresponding fields in the format of said second email program; and storing said portion of native email data into said universal database and marking said portion as being not supported by said second email program.

6. The method of claim 5 wherein converting said universal database into the format of said second email program further includes: converting said portion of native email data into selected fields of the format of said second email program such that said portion of native email data is able to be viewed via said second email program.

7. The method of claim 1 wherein said email data is maintained on the portable storage device in a native format email database and the universal database.

8. The method of claim 7 wherein said synchronizing said native data of the first computer with said email data on said portable storage device further includes: determining whether the native format email database of said portable storage device and the universal database of said portable storage device are out of sync; and cross-synchronizing said native format email database with said universal database on the portable storage device.

9. The method of claim 1 wherein generating a second native database further includes: creating a temporary folder on the second computer; and storing, into said temporary folder, data that has been retrieved from the universal database and converted into the format of said second email program.

10. The method of claim 1 wherein synchronizing native email data of the first computer with email data on said portable storage device further includes: writing data to at least one of the portable storage device and the first computer in order to ensure that both the portable storage device and said first computer have a latest version of said email data.

* * * * *